(12) United States Patent
Alonso Gago et al.

(10) Patent No.: US 9,067,673 B2
(45) Date of Patent: Jun. 30, 2015

(54) MEASUREMENT OF THE INERTIAL PROPERTIES OF AN AIRCRAFT MOVABLE CONTROL SURFACE

(71) Applicant: Airbus Operations S.L., Getafe (ES)

(72) Inventors: Justo Alonso Gago, Getafe (ES); Pedro Valera Rodriguez, Getafe (ES)

(73) Assignee: Airbus Operations S.L., Getafe (Madrid) (ES)

( * ) Notice: Subject to any disclaimer, the term of this patent is extended or adjusted under 35 U.S.C. 154(b) by 258 days.

(21) Appl. No.: 13/845,310

(22) Filed: Mar. 18, 2013

(65) Prior Publication Data

US 2014/0021294 A1    Jan. 23, 2014

(30) Foreign Application Priority Data

Jul. 20, 2012    (EP) .................................... 12382293

(51) Int. Cl.
| | |
|---|---|
| *G01M 1/12* | (2006.01) |
| *B64C 13/28* | (2006.01) |
| *B64F 5/00* | (2006.01) |
| *G01M 7/02* | (2006.01) |
| *G01M 1/10* | (2006.01) |

(52) U.S. Cl.
CPC ............... *B64C 13/28* (2013.01); *B64F 5/0045* (2013.01); *G01M 7/02* (2013.01); *G01M 1/10* (2013.01)

(58) Field of Classification Search
CPC ......... G01M 1/12; G01M 1/122; G01G 19/00
USPC ........................ 73/9, 65.01, 65.03, 65.07, 583
See application file for complete search history.

(56) References Cited

U.S. PATENT DOCUMENTS

| | | | |
|---|---|---|---|
| 2,782,631 A | 2/1957 | Baltrukonis et al. | |
| 3,229,934 A * | 1/1966 | Vogtle | ............................. 244/80 |
| 3,416,362 A | 12/1968 | McGahan | |
| 8,566,054 B1 * | 10/2013 | Schweigert et al. | ............ 702/87 |
| 2007/0173988 A1 * | 7/2007 | Pitt et al. | ......................... 701/10 |
| 2011/0004361 A1 * | 1/2011 | Goupil et al. | ..................... 701/3 |

FOREIGN PATENT DOCUMENTS

DE          29622132          3/1998

OTHER PUBLICATIONS

European Search Report, Dec. 12, 2012.

* cited by examiner

*Primary Examiner* — Lisa Caputo
*Assistant Examiner* — Nathaniel T Woodward
(74) *Attorney, Agent, or Firm* — Greer, Burns & Crain Ltd.

(57) ABSTRACT

A method for obtaining the inertial properties of a movable rotating around a hinge line in an aircraft control surface. The method includes the steps of removing the mechanical connections of the actuators from the movable, leaving the movable free to rotate around its hinge line, further balancing the movable and calculating in a first approach its coarse static moment. The method includes refining the coarse static moment and obtaining simultaneously a frictional moment of the movable; incorporating an elastic element on the control surface and configuring a second order mechanical system; inducing forced oscillations on the movable at a certain frequency, this frequency being increased until it is sensibly close to the resonance frequency of the movable to produce a wave response; calculating, from the wave response, the moment of inertia of the movable.

10 Claims, 5 Drawing Sheets

MEASUREMENT OF THE INERTIAL PROPERTIES OF AN AIRCRAFT MOVABLE CONTROL SURFACE

CROSS-REFERENCES TO RELATED APPLICATIONS

This application claims the benefit of the European patent application No. 12382293.4 filed on Jul. 20, 2012, the entire disclosures of which are incorporated herein by way of reference.

BACKGROUND OF THE INVENTION

The present invention relates to a method for measuring the inertial properties (static moment, frictional moment and moment of inertia) of an aircraft movable control surface. The invention further refers to a mechanical arrangement for operating the cited method.

Aircraft movable control surfaces, such as aircraft elevators, have to be sometimes, under certain circumstances, tested in order to determine whether or not they comply with certain acceptance criteria. Currently, the practical method used for determining the acceptance of a movable control surface is the measurement of its mass and of its center of gravity, these two components allowing the calculation of its static moment, such that this static moment remains within a certain range.

Aircraft movable control surfaces vary slightly their mass, after some period of operation, by water ingestion or by any other matters, or immediately after a damaged unit has been repaired, as these reparations often need extra patches. For this reason, the mass control has to be monitored in time, so that the inertial properties of the movable control surface remain under acceptable limits, as any deviation would affect the dynamic behaviour of the aircraft. Consequently, the control of the inertial properties of the movable control surface is essential.

However, for the known measuring processes of the mass and center of gravity of the movable control surface, the affected unit needs to be removed from the aircraft, which is a cumbersome process requiring long timings and being costly and unpractical, as the process is performed with a crane or other means and needs one hanging scale in each of the hoist points. To get the correct weight of the control surface, it must be unlinked from the aircraft structure such that, when an elevator is measured, for example, the elevator has to be removed from its stabilizer and needs to be lifted with a crane through a sling attached to each of the hoist points, using a hanging scale in each of the hoist points attached to the sling. This task is performed by operators manually, being unpractical, time consuming and expensive.

The present invention proposes a different method of acceptance for aircraft movable control surfaces.

SUMMARY OF THE INVENTION

By the method object of the present invention, the acceptance of an aircraft movable control surface is made by controlling its inertial properties (static moment, frictional moment and moment of inertia), such that these inertial properties remain within a certain range. Besides, the method of the invention does not require the removal of the movable control surface from the aircraft.

The aircraft elements object of the method disclosed in the present invention are, precisely, the movable parts of the aircraft movable control surfaces, hereinafter called movables.

A first object of the invention is to provide a method for obtaining the inertial properties of a movable.

Another object of the invention is to provide a mechanical arrangement for operating the above-mentioned method.

The main advantage of the method in the invention is that the inertial properties of the movable are obtained without its removal from the aircraft, which means that the costs involved in the method are significantly reduced compared to the known procedures of the prior art.

The mechanical arrangement used in the method of the invention comprises the following elements:
  a first part attached to the stabilizer (fixed part of the control surface) or to the ground, in order to provide a suitable point of anchorage;
  a second part attached to the movable, this second part comprising a counterweight adjustable both vertically and horizontally, a movement transducer that captures the angular movement of the movable and a vibration generator, that induces forced oscillations on the movable; and
  an elastic element, linking the first part and the second part in the mechanical arrangement.

The method of the invention is directed towards obtaining the inertial properties of the movable, the method comprising the following steps:
  (a) incorporating the second part of the mechanical arrangement on the movable, configuring what hereinafter will be called a movable assembly;
  (b) removing the mechanical connections of the actuators from the movable, leaving it free to rotate around its hinge line;
  (c) balancing the movable assembly so that its center of gravity lies on the close neighbourhood of the hinge line (coarse balancing);
  (d) calculating in a first approach the static moment of the movable;
  (e) refining the static moment of the movable obtained in d), obtaining simultaneously the frictional moment of the movable;
  (f) performing an additional adjustment to fix the rest position of the control surface: for this step, it is necessary that the first part of the mechanical arrangement, together with the elastic element, have been previously incorporated on the control surface;
  (g) activating the vibration generator;
  (h) acquiring the wave response of the movable assembly as well as the vibration generator output;
  (i) stopping the vibration generator after a time long enough to capture sufficient information for carrying out step j);
  (j) calculating the resonance frequency of the movable assembly;
  (k) calculating the moment of inertia of the movable assembly from the resonance frequency obtained in j);
  (l) subtracting the contribution to the moment of inertia, previously determined in a laboratory, for example, of the components of the mechanical arrangement incorporated in a) to the moment of inertia in k), thus obtaining the moment of inertia of the movable.

Other desirable features and advantages of this invention will become apparent from the subsequent detailed description of the invention and the appended claims, in relation with the enclosed drawings.

DETAILED DESCRIPTION OF THE PREFERRED EMBODIMENTS

Once the static moment and the frictional moment of a movable 10 in an aircraft control surface 1 are determined, the method of the invention analyses the response to forced oscillations of said movable 10: in the Figures attached, the corresponding case of an elevator has been represented, where this movable 10 (elevator) rotates around a hinge line 2.

Figure 1A:
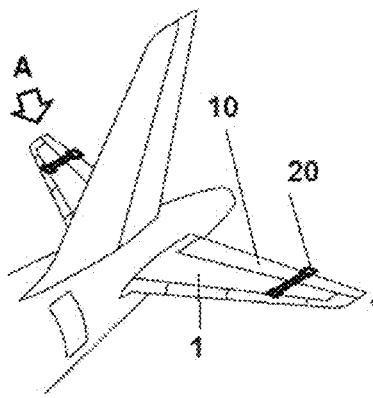
FIGS. 1a and 1b show schematically the mechanical arrangement for operating the method for measuring the inertial properties of a movable, according to the present invention.
Figure 1B:
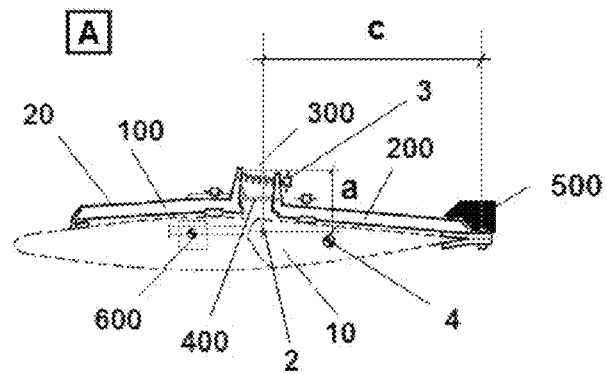
Figure 2:
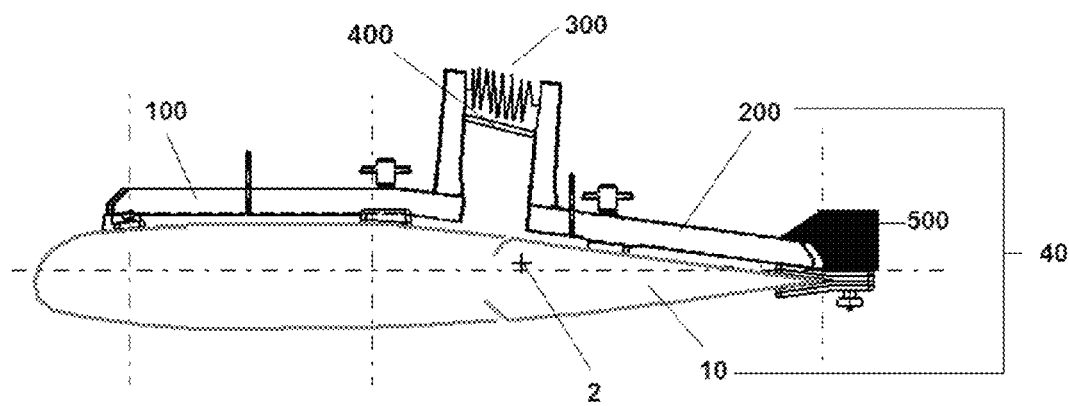
FIG. 2 shows part of the components of the mechanical arrangement for operating the method for measuring the inertial properties of a movable, according to the present invention.
Figure 5:
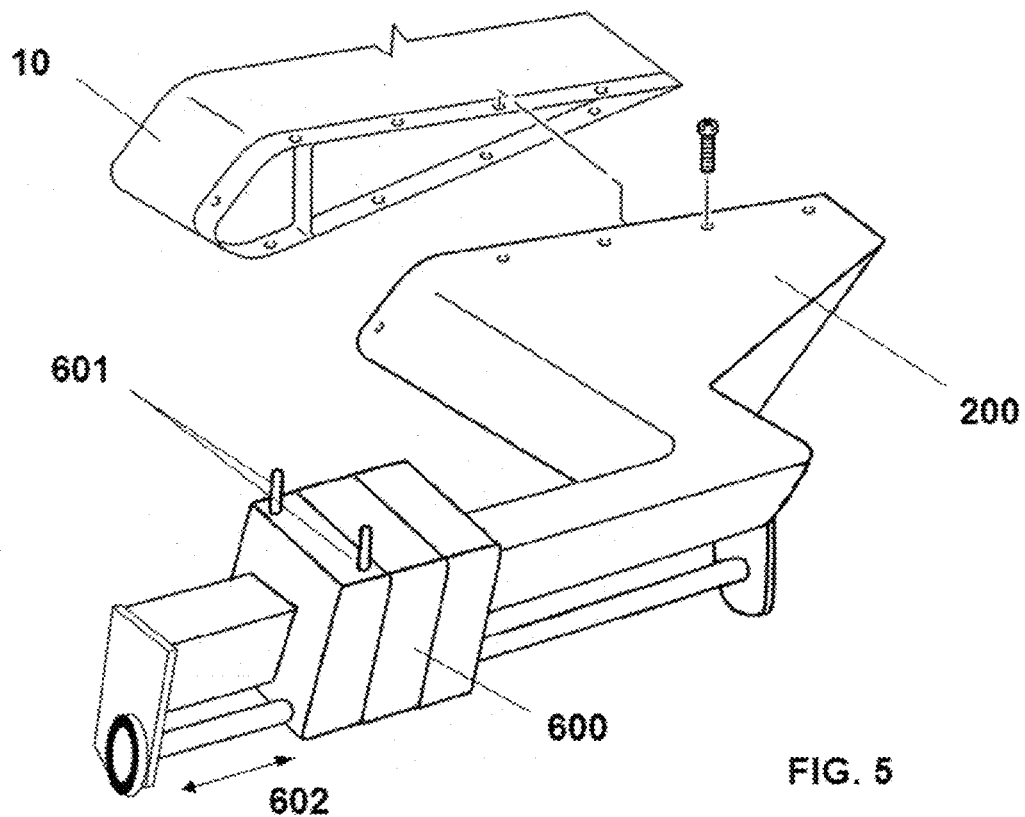
FIG. 5 shows the counterweight in the mechanical arrangement for operating the method for measuring the inertial properties of a movable, according to the present invention.

The mechanical arrangement 20 for operating the above-mentioned method is schematically represented in FIGS. 1b and 2, and it comprises:

a first part 100 attached to the stabilizer, which is the fixed part of the control surface 1, or to the ground, in order to provide a suitable point of anchorage;

a second part 200 attached to the movable 10, such that this second part 200 together with the movable 10 form what is called throughout this description a movable assembly 40, this second part 200 comprising an adjustable counterweight 600 (that can be adjusted in height and also in length, by way of acting on a height adjusting device 601 and on a length adjusting device 602, respectively, as shown in FIG. 5) a movement transducer 400, capturing the angular movement of the movable assembly 40, and a vibration generator 500, generating forced oscillations on the movable assembly 40; and an elastic element 300, typically a spring, linking the first part 100 and the second part 200 in the mechanical arrangement 20.

According to the invention, it should be desirable that the moment of inertia of the mechanical arrangement 20 around the hinge line 2 is minimized, for the sake of the accuracy of the results.

Figure 6:
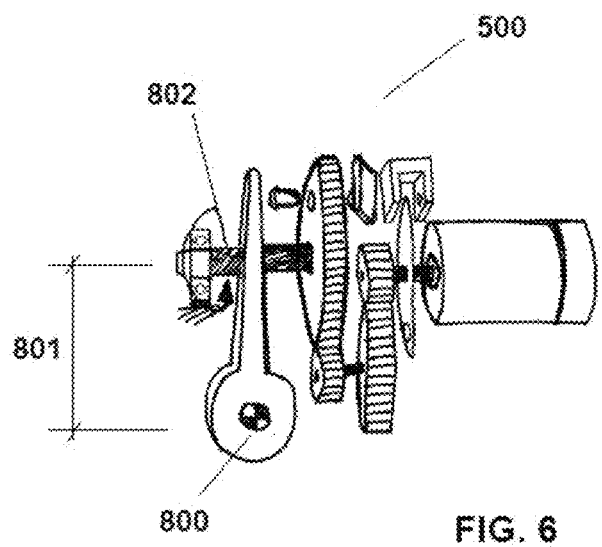
FIG. 6 shows a detail of a possible configuration of a vibration generator having an eccentric mass rotating around an axis, in the mechanical arrangement for operating the method for measuring the inertial properties of a movable, according to the present invention.

A possible embodiment of the vibration generator 500 is shown in FIG. 6, comprising an eccentric mass 800 that rotates around an axis 802, at a distance of 801. Different embodiments of the vibration generator 500 are also possible.

Figure 3:
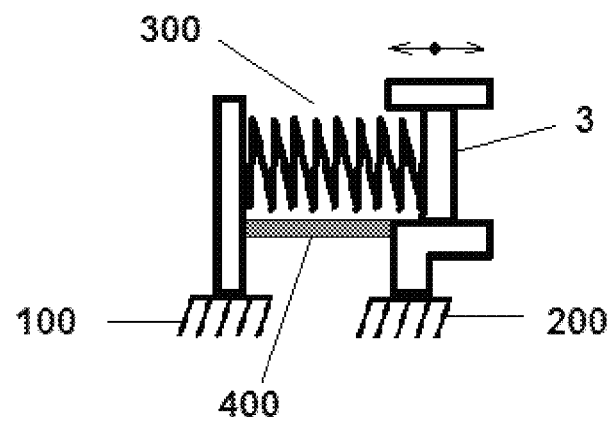
FIG. 3 shows a possible configuration of the elastic element in the mechanical arrangement for operating the method for measuring the inertial properties of a movable, according to the present invention.
Figure 4A:
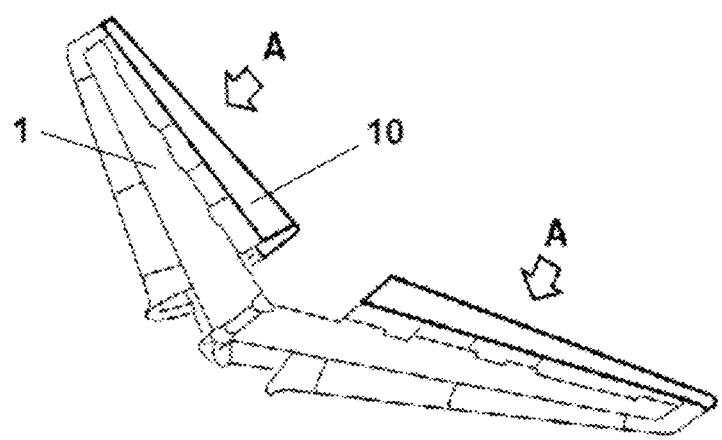
FIGS. 4a and 4b show schematically a method for controlling the mass and the center of gravity of a movable, according to the known prior art, using a hanging scale per hoisting point used, a crane and a sling.
Figure 4B:
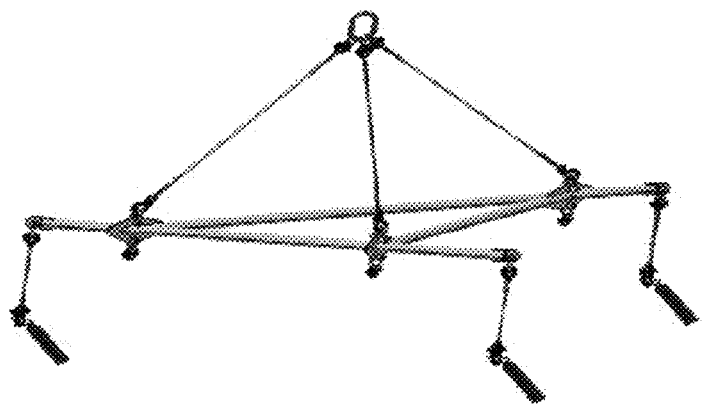

Both parts 100 and 200 are connected mechanically by means of the elastic element 300, typically a spring having a known elastic constant and having an adjustable position by means of an adjusting device 3, as shown in FIG. 3. The elastic element 300 is attached on one of its sides to the first part 100, and is attached on the other of its sides to the second part 200, the elastic element 300 being displaceable on one of its sides, therefore allowing the adjustment of the rest position of the mechanical arrangement 20.

Each control surface 1 item, typically an elevator, will have associated a specific elastic element 300, typically a spring, having an elastic constant that is chosen to produce a suitable resonance frequency of the movable assembly 40, typically 2 Hz. The adjusting device 3 allows the adjustment of the mechanical arrangement 20 to the angular position of the movable assembly 40, therefore fixing the zero position for carrying out the method of the invention. The movable assembly 40, after the elastic element 300 has been connected and once the balance has been performed, constitutes a second order mechanical system. This system has a resonance frequency which is a function of the elastic constant of the elastic element 300 and of the moment of inertia of the movable assembly 40. As the elastic constant of the elastic element 300 is a function of a desirable resonance frequency that has been chosen, the real resonance frequency is unknown (to be determined) but will be very close to that used to obtain the elastic constant of the elastic element 300.

Typically, the mechanical arrangement 20 is also connected to a computer (laptop) and some portable electric equipment, in order to analyze the data and carry out the method of the invention.

For the sake of clarity, although practical executions lead to different embodiments, the Figures attached to this Description show the main concepts underlying the invention. However, practical embodiments can be different from those represented in the Figures: for example, a preferred embodiment of the mechanical arrangement 20 would entail that the vibration generator 500 is located on the left side of the mechanical arrangement 20, and would be comprised within the adjustable counterweight 600 structure: the moment of inertia of the movable assembly 40 is reduced, which improves the quality of the measurement.

The method proposed in this invention allows the adjustment of the frequency of the vibration generator 500: this frequency increases progressively (from a lower value than that of the resonance), until the maximum deflection of the movable 10 gets close to the admissible limits known for the control surface 1, which indicates the close proximity to the resonance frequency of the movable assembly 40, as it will be further explained in detail.

Figure 9:
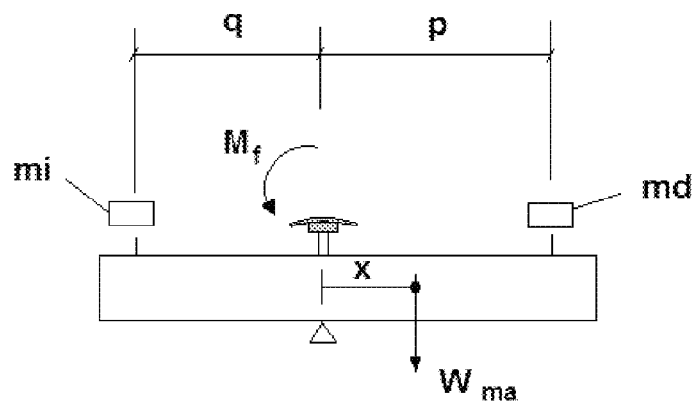
FIG. 9 shows the principles underlying refining the static moment of the movable and obtaining the frictional moment of the movable in the method for measuring the inertial properties of a movable, according to the present invention.

The method of the invention is therefore directed towards the measurement of the inertial properties of the movable 10 of a control surface 1, this movable 10 being typically an elevator, the method comprising the following steps:

a) incorporating the second part 200 of the mechanical arrangement 20 on the control surface 1, thus configuring the movable assembly 40;

b) removing the mechanical connections of the actuators from the movable 10, leaving it free to rotate around its hinge line 2;

c) balancing the movable assembly 40 so that its center of gravity 4 lays on the close neighborhood of the hinge line 2 (coarse balancing);

d) calculating in a first approach the coarse static moment of the movable 10;

e) refining the coarse static moment of the movable 10 obtained in d), and obtaining simultaneously the frictional moment of the movable 10, which comprises the following steps:

i) placing a known mass at a given distance p (see FIG. 9) to the right of the hinge line 2, progressively adding more of said known mass until the movable 10 overcomes the frictional band and starts rotating;

ii) entering the data of the total mass md used in step i) together with the distance p into the formula (3);

iii) removing the total mass md and placing a known mass at a given distance q (see FIG. 9) to the left of the hinge line 2, progressively adding more of said known mass until the movable 10 overcomes the frictional band and starts rotating in the sense contrary to the rotation sense in i);

iv) entering the data of the total mass mi used in step iii) together with the distance q into the formula (4);

v) calculating, using the formula (5), the increment of the static moment ($\Delta M$ static=$W_{ma} \cdot x$) of the movable 10 that corrects the coarse static moment calculated in previous step e);

vi) calculating, using the formula (6) below, the frictional moment Mf in the hinge 2;

$$\Delta Mstatic + m_d g p = Mf \quad (3)$$

$$\Delta Mstatic - m_i g q = Mf \quad (4)$$

$$\Delta Mstatic = \frac{m_i g q - m_d g p}{2} \quad (5)$$

$$Mf = \frac{m_d g p + m_i g q}{2} \quad (6)$$

$$\Delta Mstatic = W_{ma} \cdot X \quad (7)$$

f) performing an additional adjustment to fix the rest position of the movable control surface 1, that is, the zeroes of the oscillating movement, by performing a tuning of the adjusting device 3 of the elastic element 300, such that this position is equidistant from the limits restricting the maximum movement (deflection) of the movable 10 on each of the two sides, being necessary that the first part 100 of the mechanical arrangement 20, together with the elastic element 300, have been previously incorporated on the control surface 1;

g) activating the vibration generator 500;

h) acquiring the wave response (position angle versus time) of the movable assembly 40, at a high rate, for example above 10,000 samples/second, as well as the output of the vibration generator 500;

i) stopping the vibration generator 500 after a time long enough to obtain two lobes in the "beating" wave response of the movable assembly 40 obtained in h);

measuring the frequency of the first lobe ($W_{lobe}$), thus calculating, together with the output rotation frequency ($\Omega_{rot}$) of the vibration generator 500, the real resonance frequency of the movable assembly 40 ($W_{reson}$), using the formula (1);

$$\omega_{reson} = 2 \cdot \omega_{lobe} + \Omega_{rot} \quad (1)$$

k) obtaining from the resonance frequency ($W_{reson}$) in j) the moment of inertia of the movable assembly 40 ($I_{tot}$) according to formula (2);

$$I_{tot} := \frac{k \cdot a^2}{(\omega_{reson})^2} \quad (2)$$

l) subtracting the contribution to the moment of inertia of the components of the mechanical arrangement 20 incorporated in a) to the moment of inertia in k), thus obtaining the moment of inertia of the movable 10.

In step h), the wave response (position angle versus time) of the movable assembly 40 is acquired at a high rate, for example above 10,000 samples/second: from this response, the frequency of the first lobe (Wlobe) is obtained. Also, in step h), the output of the vibration generator 500 is obtained: from this response, the output rotation frequency ($\Omega$rot) of the vibration generator 500 is obtained. Preferably, a computer is used for acquiring and treating the wave response in h) and for calculating the frequency of the first lobe (Wlobe) and the output rotation frequency ($\Omega$rot) of the vibration generator 500.

Figure 7:
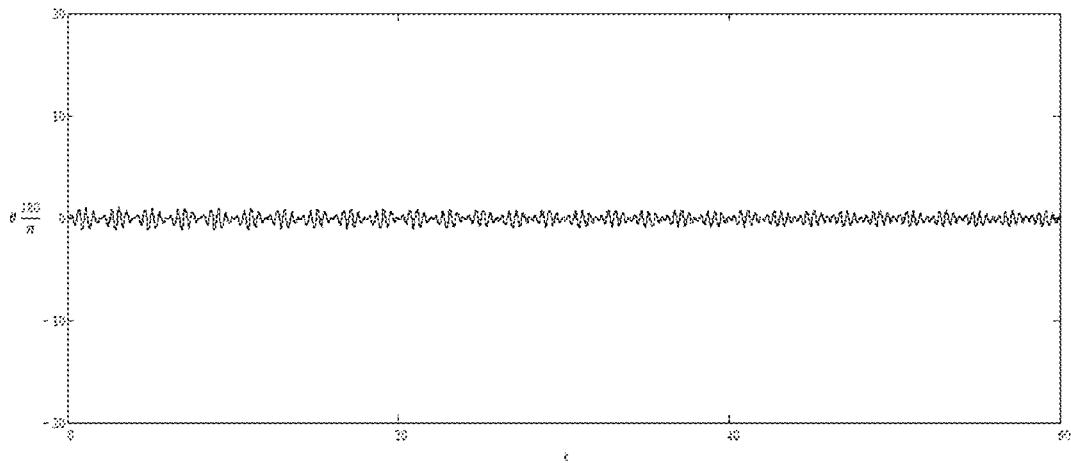
FIG. 7 plots the angular position versus time of a movable assembly, which is the response when the excitation frequency in the method according to the invention is substantially far from the resonance frequency of the movable assembly.
Figure 8:
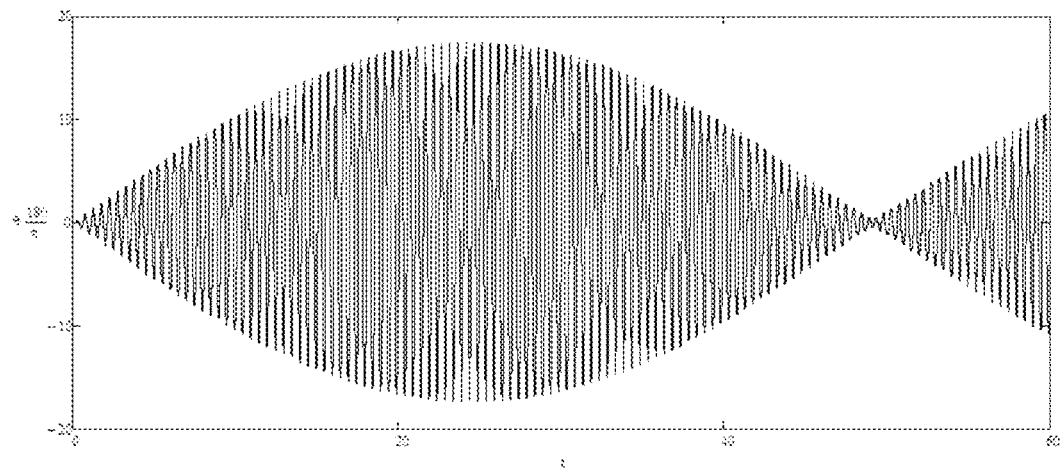
FIG. 8 plots the angular position versus time of a movable assembly, which is the response when the excitation frequency in the method according to the invention is substantially close to the resonance frequency of the movable assembly.

FIG. 7 shows the plotted response obtained in step h), showing the position angle versus time of the movable assembly 40, when the excitation frequency provided by the vibration generator 500 is far from the resonance frequency of the movable assembly 40. When the excitation frequency is very close to the resonance frequency, the type of response is that shown in FIG. 8: this response is suitable for obtaining the moment of inertia of the movable assembly 40 (Itot). The period of the lobe (Wlobe), can thus be accurately measured, and entered in the formula (1) above. The protocol starts with a rotation frequency ($\Omega$rot) of the vibration generator 500 lower than the expected resonance frequency of the movable assembly 40 (Wreson); the process is then repeated with frequencies of rotation ($\Omega$rot) that are progressively higher; the different plotted responses are observed, until the maximum lobe amplitude approaches the maximum deflection allowed for the movable 10: at this stage, the rotation frequency ($\Omega$rot) and the period of the lobe (Wlobe) are appropriate for being entered in the formula (1), where the value of the resonance frequency of the movable assembly 40 (Wreson) is calculated.

Furthermore, an additional advantage of the method of the invention is the simultaneous calculation of the frictional moment of the movable 10 when rotating around the hinge line 2, as cited in step e) above. For the calculation of the frictional moment, the mechanical arrangement 20 of the control surface 1 is used without the elastic element 300. The center of gravity of the movable assembly 40 would be aligned with the hinge line 2 if there existed no frictional moment; as a small frictional moment exists, this situation does not occur and the center of gravity of the movable assembly 40 has a small offset with respect to the hinge line 2.

In a preferred embodiment of the invention, after step iv) mentioned above, the increment of the static moment ($\Delta M$ static) of the movable 10 is calculated using the formula (5) above, as a first approach. This value of $\Delta M$ static is then used for refining the static moment of the movable 10 (as cited in step e) above): an element having a mass calculated such that it provides a static moment that neutralizes the static moment of the movable 10, this element being located at a certain distance from the hinge line 2 (to the right side or the left side of the hinge line 2, depending on the mathematical sign obtained from the formula (5)) is used for carrying out the rest of the method steps f) to l). The mathematic signs used are such that the positive sign corresponds to the elevator, rotating in a clockwise sense.

The concept of lobe used in the present invention disclosure will be explained in further detail now. When a mechanical system is excited with a frequency close to its natural resonance, its response follows a movement, angular in this case, as the one represented in FIG. 8. The term lobe used in this description corresponds to a set of oscillations that starts with the zero level of the origin of one oscillation having minimum amplitude and finishes with the zero level of the end of the next oscillation having minimum amplitude: for example, in FIG. 8, there is only one of these lobes shown.

Although the present invention has been described in connection with various embodiments, it will be appreciated from the specification that various combinations of elements, variations or improvements therein may be made, and are within the scope of the invention.

The invention claimed is:

1. A method for obtaining the inertial properties of a movable rotating around a hinge line in an aircraft control surface, comprising the following steps:
   a) removing all mechanical connections of actuators from the movable, leaving the movable free to rotate around the hinge line, further balancing the movable and calculating in a first approach a coarse static moment of the movable;
   b) refining the static moment of the movable obtained in a), and obtaining simultaneously a frictional moment of the movable;
   c) incorporating an elastic element on the control surface, configuring a second order mechanical system;
   d) inducing forced oscillations on the movable at a certain frequency, this frequency being increased until it is sensibly close to a resonance frequency of the movable to obtain a wave response;
   e) calculating, from the wave response in d), a moment of inertia of the movable.

2. The method according to claim 1, wherein the forced oscillations induced in d) are produced at a frequency of around 2 Hz.

3. The method according to claim 1, wherein the forced oscillations induced in d) are such that they provide a wave response of the movable at a high rate, above 10,000 samples/second.

4. The method according to claim 1, wherein the refining of the static moment of the movable in step b) allowing obtaining simultaneously its frictional moment, comprises the following steps:
   i) placing a known mass at a given distance to the right of the hinge line, progressively adding more of said known mass until the movable overcomes a frictional band and starts rotating, with a value of the total mass of md;
   ii) removing the total mass md and placing a known mass to the left of the hinge line, progressively adding more of said known mass until the movable overcomes a frictional band and starts rotating in the sense contrary to the rotation sense in i), with a value of the total mass of mi;
   iii) calculating the increment of the static moment of the movable that corrects the static moment calculated in step b); calculating the frictional moment in the hinge line.

5. A mechanical arrangement for a control surface of an aircraft having a movable part comprising a movable, the aircraft resting on a support surface, comprising:
   a first part attached to one of a fixed portion of the aircraft and the support surface, in order to provide a suitable point of anchorage;
   a second part attached to the movable configuring a movable assembly, this second part comprising an adjustable counterweight, a movement transducer that captures the angular movement of the movable and a vibration generator, that induces forced oscillations on the movable; and
   an elastic element, linking the first part and the second part in the mechanical arrangement.

6. The mechanical arrangement according to claim 5, wherein the elastic element has an elastic constant with a value such that it produces a desired resonance frequency of the movable assembly.

7. The mechanical arrangement according to claim 5, wherein a resonance frequency of the movable assembly is around 2 Hz.

8. The mechanical arrangement according to claim 5, wherein the elastic element is attached on one of its sides to the first part and is attached on the other of its sides to the second part, the elastic element being displaceable on one of its sides in such a way to allow an adjustment of a rest position of the mechanical arrangement.

9. A mechanical arrangement according to claim 5, wherein the vibration generator is located within a structure of the adjustable counterweight.

10. An aircraft elevator comprising a mechanical arrangement according to claim 5.

* * * * *